Figure 2:
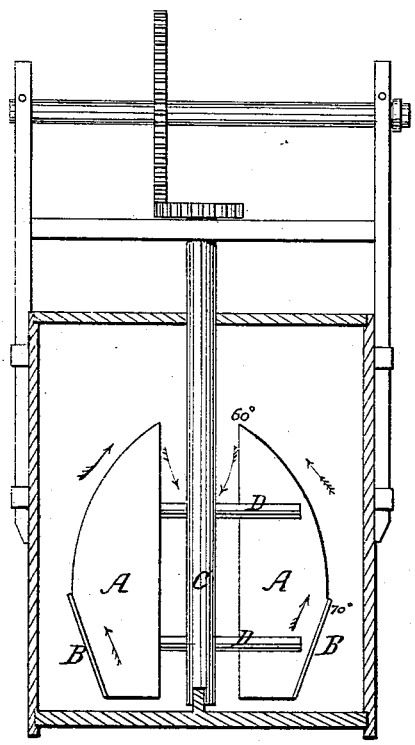

S. HEWIT.
Churn.

No. 17,790.

Patented July 14, 1857.

UNITED STATES PATENT OFFICE.

SILAS HEWIT, OF SENECA FALLS, NEW YORK.

CHURN.

Specification of Letters Patent No. 17,790, dated July 14, 1857.

*To all whom it may concern:*

Be it known that I, SILAS HEWIT, of Seneca Falls, in the county of Seneca and State of New York, have invented a new and Improved Mode of Constructing Churns; and I do hereby declare that the following is a full and exact description of the same, reference being had to the accompanying drawings and to the letters of reference marked thereon.

The nature of my invention relates to the peculiar mode of constructing the paddle or float with a flange on each of its outward edges, set on an angle of about 70 degrees with the bottom of the churn, and of making the upper part of the paddle on a curved line which shall terminate at a point which shall be on an angle of about 60 degrees to the right or left of the terminating point of the top end of the flange and with the bottom of the tub, leaving a space between the shaft and inner edge of the paddle of about one to two inches for the cream to pass through. The great advantage of the flanges consists in their forcing the cream continually in an upward current, and the angle of the floats at the top inclining inward the cream thus forced up is allowed to fall around the shaft downward through the center of the churn to the bottom of the tub, where it is again caught by the flanges and is again forced upward; and thus a continually agitated current is kept up in the cream in the direction indicated by the arrows in the drawings. I have found by experiment the most powerful agitation of the cream, and the best results can be produced by constructing the flanges and floats about on the angles above mentioned.

The different letters on each figure refer to the same part.

Figure 3:
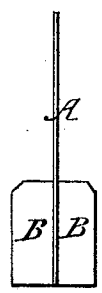
Figure 1:
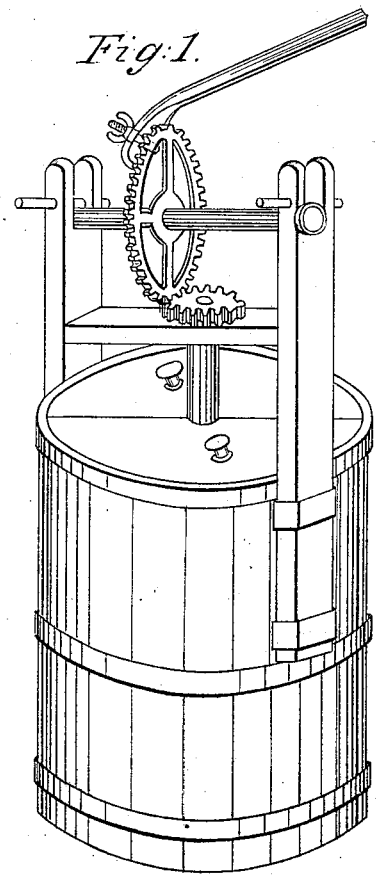

Figure 1 is a perspective view of my churn. Fig. 2 is a cross section of the same and showing a side view of the floats and the manner of attaching them to the shaft. Fig. 3 represents a side view of the flanges and edge view of the float; A, the float; B, the flange; C, the shaft; D, the arms passing through the shaft with the floats attached to them.

Having thus described my improved churn, what I claim as new, and desire to secure by Letters Patent, is—

The floats A in combination with the flanges B, constructed and arranged in the manner and for the purposes set forth.

SILAS HEWIT.

Witnesses:
J. H. MERRILL,
J. H. GODDARD.